(12) United States Patent
Settle et al.

(10) Patent No.: US 12,370,960 B1
(45) Date of Patent: Jul. 29, 2025

(54) TRUCK BED LINER TO FACILITATE UNLOADING

(71) Applicants: Clarence Settle, Laciede, ID (US); Dana Homan, Priest River, ID (US)

(72) Inventors: Clarence Settle, Laciede, ID (US); Dana Homan, Priest River, ID (US)

( * ) Notice: Subject to any disclaimer, the term of this patent is extended or adjusted under 35 U.S.C. 154(b) by 0 days.

(21) Appl. No.: 18/812,204

(22) Filed: Aug. 22, 2024

(51) Int. Cl.
*B60R 13/01* (2006.01)

(52) U.S. Cl.
CPC ................... *B60R 13/01* (2013.01)

(58) Field of Classification Search
CPC ....................................................... B60R 13/01
USPC .................................................. 414/402, 527
See application file for complete search history.

(56) References Cited

U.S. PATENT DOCUMENTS

| | | | | |
|---|---|---|---|---|
| 223,082 A * | 12/1879 | Tyler | ...................... | B65G 67/08 |
| | | | | 414/393 |
| 1,015,074 A * | 1/1912 | Rice | ......................... | B23Q 7/10 |
| | | | | 414/521 |
| 1,099,555 A * | 6/1914 | Lawrence | ............... | B60P 1/006 |
| | | | | 414/539 |
| 1,207,795 A * | 12/1916 | Riekenberg | ............ | B65G 67/08 |
| | | | | 294/74 |
| 1,329,392 A * | 2/1920 | Ford | ...................... | B65G 67/24 |
| | | | | 414/389 |
| 2,407,430 A * | 9/1946 | Macrae | ................... | B60P 1/006 |
| | | | | 414/402 |
| 2,662,650 A * | 12/1953 | Russell | ................... | B60P 1/006 |
| | | | | 414/539 |
| 2,923,423 A * | 2/1960 | Maney | ..................... | B60J 7/062 |
| | | | | 414/539 |
| 3,411,825 A | 11/1968 | Fulton | | |
| 3,480,321 A * | 11/1969 | Brandt | ................... | B61D 17/18 |
| | | | | 105/364 |
| 5,295,779 A * | 3/1994 | Mihalich | ............... | B65G 67/24 |
| | | | | 414/809 |
| 5,452,973 A | 9/1995 | Arvin | | |
| 6,017,174 A | 1/2000 | Ross et al. | | |
| 6,131,983 A * | 10/2000 | Jackson | .................. | B60R 13/01 |
| | | | | 296/39.1 |
| 8,292,559 B1 * | 10/2012 | Foggy | .................. | B60P 7/0876 |
| | | | | 410/96 |
| 8,430,441 B2 * | 4/2013 | Waterman | ............... | B60R 13/01 |
| | | | | 296/183.1 |
| 8,544,922 B1 * | 10/2013 | Huzar | .................... | B65D 85/52 |
| | | | | 294/157 |
| 8,955,898 B2 * | 2/2015 | Bemis | ...................... | B60P 1/00 |
| | | | | 296/39.2 |
| 9,669,994 B2 * | 6/2017 | Clevenger | ............... | B65F 1/002 |
| 11,597,333 B2 * | 3/2023 | Stevens | ..................... | B60P 7/04 |

(Continued)

FOREIGN PATENT DOCUMENTS

JP          63057432 A  *  3/1988

*Primary Examiner* — James Keenan
(74) *Attorney, Agent, or Firm* — Cramer Patent & Design, PLLC.; Aaron R. Cramer (57) ABSTRACT

The quick unload truck bed liner is a bed liner panel with multiple straps designed for easy unloading of a truck bed. The bed liner panel protects the cargo bed from bulk cargo. The straps include at least two rear straps that prevent the panel from sliding during loading, and front straps that allow quick unloading by pulling them rearward over the cargo, causing the panel to overturn the cargo from front to rear. The liner may also feature an unloading cable and handles to assist in unloading.

2 Claims, 5 Drawing Sheets

(56) References Cited

U.S. PATENT DOCUMENTS

| | | |
|---|---|---|
| 2009/0315387 A1 | 12/2009 | Smith |
| 2011/0202199 A1 | 8/2011 | Crane |
| 2011/0204697 A1 | 8/2011 | Paxton |
| 2013/0034401 A1 | 2/2013 | Sauerwald |
| 2013/0121785 A1 | 5/2013 | Coury et al. |
| 2017/0118948 A1 | 5/2017 | Fahey |
| 2021/0339669 A1* | 11/2021 | Balzola .................. B60P 1/286 |
| 2021/0362642 A1 | 11/2021 | DeLangis et al. |

* cited by examiner

TRUCK BED LINER TO FACILITATE UNLOADING

RELATED APPLICATIONS

None.

FIELD OF THE DEVICE

The device of the present application falls under the category of vehicle accessories, specifically designed for pickup trucks. It relates to a quick unload truck bed liner system that facilitates the efficient unloading of bulk cargo from the cargo bed of a pickup truck.

BACKGROUND OF THE DEVICE

Loading and unloading bulk cargo from the cargo bed of a pickup truck can be a labor-intensive and time-consuming task. Traditional methods often require manual lifting or the use of additional equipment to remove heavy or unwieldy items, leading to potential safety hazards and physical strain on users. Additionally, the process of unloading can cause damage to the cargo bed, reducing the lifespan of the vehicle and increasing maintenance costs. There is a need for a practical solution that simplifies the unloading process while protecting the cargo bed from damage, thus improving the overall efficiency and safety of handling bulk cargo in pickup trucks.

SUMMARY OF THE DEVICE

Embodiments of the present disclosure include a quick unload truck bed liner, which comprises a bed liner panel positioned over a cargo bed of a pickup truck to protect the bed from bulk cargo placed therein. The quick unload truck bed liner also includes at least two rear straps coupled to a rear portion of the bed liner panel and configured to prevent the bed liner panel from sliding into the cargo bed while loading the bulk cargo. Additionally, it includes a plurality of front straps coupled to a front portion of the bed liner panel and configured to facilitate unloading the bulk cargo by pulling the front straps rearward over the top of the bulk cargo, causing the bed liner panel to overturn the bulk cargo from front to rear.

In some embodiments, the bed liner panel may be a flexible tarpaulin-like barrier that separates the bulk cargo from the cargo bed and includes reinforcing elements. The bed liner panel may be made from at least one material selected from the group consisting of polyester, nylon, polyethylene, polypropylene, and canvas, and may have a thickness of at least twelve mils. The reinforcing elements may be a grid of coated steel cords. The bed liner panel may be rectangular and have a width at least equal to the side-to-side width of the cargo bed plus twice the depth of the cargo bed, and a length at least equal to the front-to-rear length of the cargo bed plus three times the depth of the cargo bed.

In some embodiments, the bed liner panel may be waterproof, UV-resistant, mildew resistant, tear/puncture resistant, or any combination thereof. It may also include a fold at the front forming a pocket for storing the plurality of straps. Each rear strap may include a length adjuster to adjust the length of the rear strap, and a strap coupler configured to detachably couple the rear strap to a rear bumper of the pickup truck.

Each front strap may include a front strap loop located at a free end, with the front straps configured in a V-shaped configuration such that the free ends may be pulled to a common point in front of the center of the bed liner panel and coupled together via the front strap loops. The quick unload truck bed liner may also include one or more front edge handles, one or more rear edge handles, one or more right edge handles, and one or more left edge handles coupled to the bed liner panel. These handles may be adapted for a user to grasp to position the bed liner panel over the cargo bed and to pull the bed liner panel to unload the bulk cargo.

The quick unload truck bed liner may also include a plurality of magnets coupled to the front one-third of the bed liner panel, operable to hold the bed liner panel in place against a cab of the pickup truck. An unloading cable may be coupled between the plurality of front straps and an anchor point to facilitate unloading the bulk cargo, with a first hook at a first end configured to couple to the front strap loops and a second hook at a second end configured to couple to the anchor point.

The anchor point may be selected from the group consisting of a trailer hitch, a tow bar, a bumper of another vehicle, and a tree. The unloading cable may be configured to be coupled to the anchor point directly using the second hook or by wrapping the unloading cable around the anchor point and coupling the second hook back onto the unloading cable.

A method for unloading bulk cargo from a pickup truck using the quick unload truck bed liner includes the following steps: first, lowering a tailgate of the pickup truck; second, positioning the bed liner panel to cover the cargo bed; third, raising the tailgate and loading the bulk cargo into the cargo bed; fourth, driving the pickup truck to a destination where the bulk cargo is to be unloaded; fifth, positioning the pickup truck with the tailgate adjacent to where the bulk cargo is to be left and facing away from an anchor point; sixth, coupling the first hook of an unloading cable to the front strap loops; seventh, coupling the second hook of the unloading cable to the anchor point; and eighth, lowering the tailgate. Finally, the method includes driving the pickup truck slowly away from the anchor point such that the front of the bed liner panel is pulled back over the top of the bulk cargo until the bulk cargo is unloaded, or alternatively, keeping the pickup truck stationary and moving the anchor point away from the pickup truck.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

DESCRIPTIVE KEY 100 quick unload truck bed liner
200 bed liner panel
202 reinforcing elements
204 fold
210 rear strap
214 length adjuster
216 strap coupler
220 front strap
222 front strap loop
232 front edge handle
234 rear edge handle
236 right edge handle
238 left edge handle
240 magnet
250 unloading cable
252 first hook
254 second hook
900 pickup truck
902 cargo bed
904 tailgate
906 rear bumper
908 cab
920 bulk cargo
930 anchor point
950 user 1. Description of the Device The present device is directed to a quick unload truck bed liner (herein described as the "device") 100. The device 100 may comprise a bed liner panel 200 and a plurality of straps. The bed liner panel 200 may be positioned over the cargo bed 902 of a pickup truck 900 to protect the cargo bed 902 from a bulk cargo 920 placed in the cargo bed 902. The plurality of straps may comprise at least two (2) rear straps 210 that may prevent the bed liner panel 200 from sliding into the cargo bed 902 while loading the bulk cargo 920. The plurality of straps may further comprise a plurality of front straps 220 which may facilitate unloading the bulk cargo 920 quickly by pulling the plurality of front straps 220 rearward over the top of the bulk cargo 920 such that the bed liner panel 200 may overturn the bulk cargo 920 from front to rear.

Figure 1:
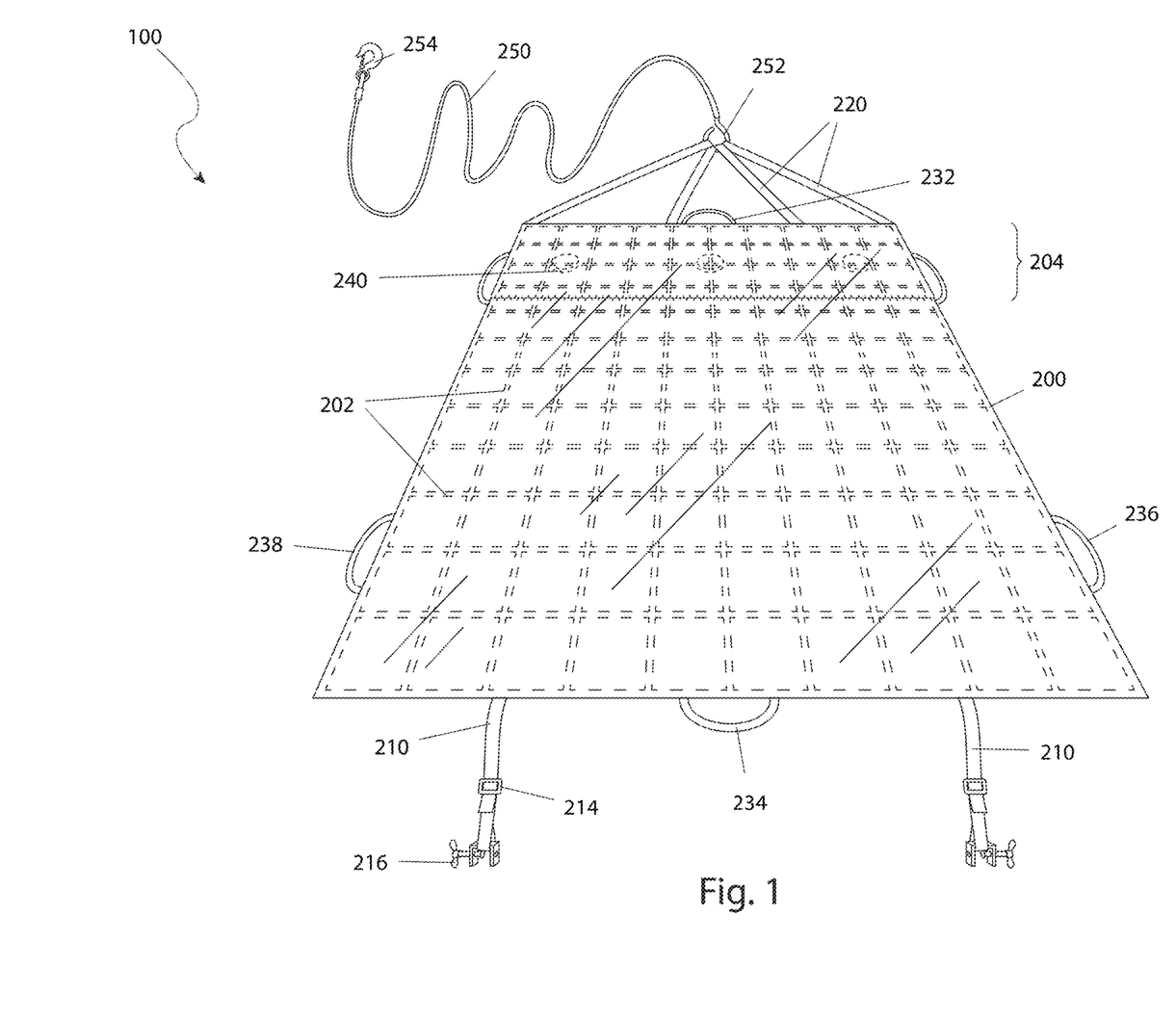
FIG. 1 is a top front isometric view of a quick unload truck bed liner 100, according to an embodiment of the present device.
Figure 3:
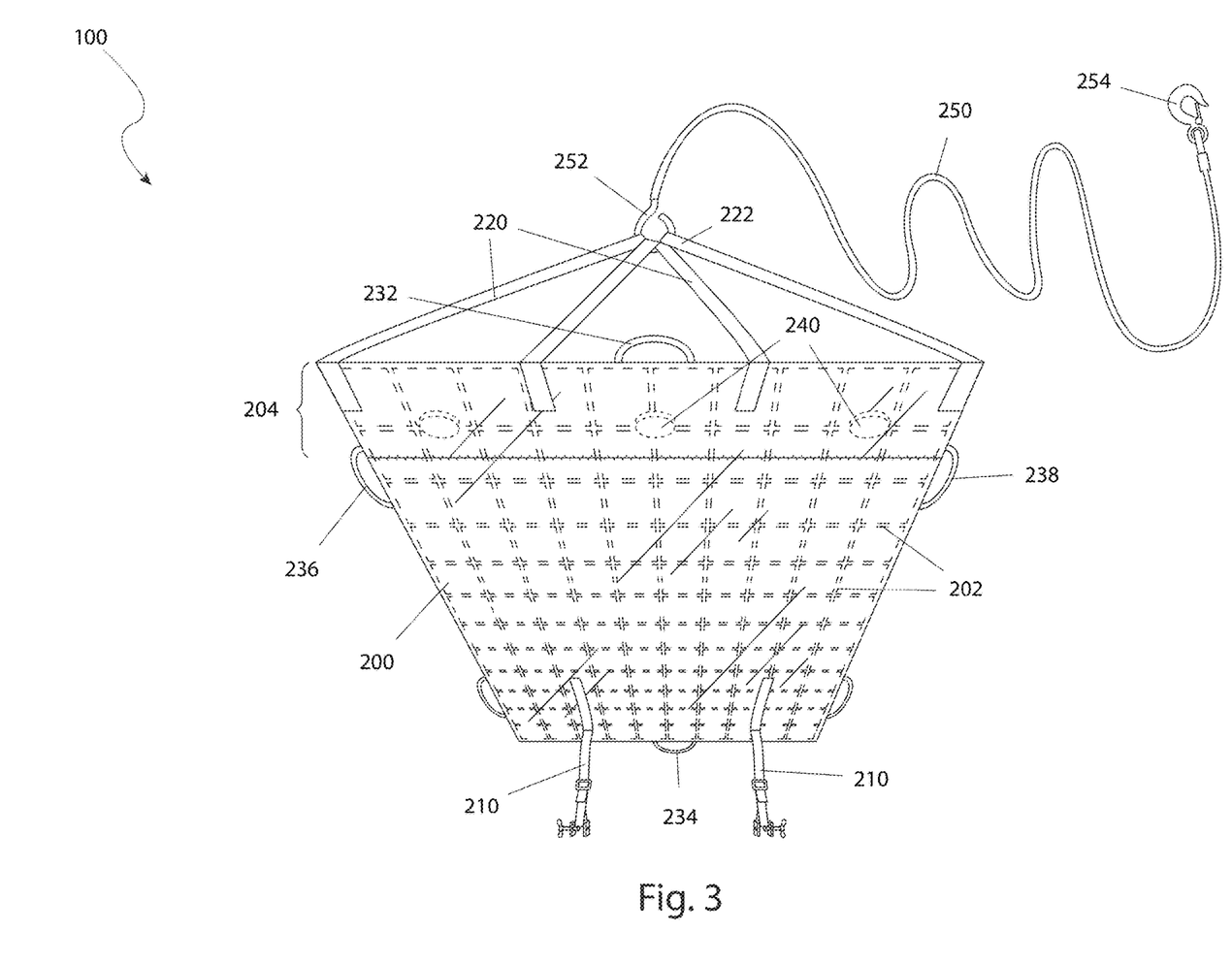
FIG. 3 is a bottom rear isometric view of a quick unload truck bed liner 100, according to an embodiment of the present device.

The bed liner panel 200 may be a flexible tarpaulin-like barrier that may cover the cargo bed 902 of the pickup truck 900 to separate the bulk cargo 920 from the cargo bed 902. The bed liner panel 200 may be impermeable and may comprise reinforcing elements 202. As non-limiting examples, the bed liner panel 200 may be made from polyester, nylon, polyethylene, polypropylene, canvas, or any combination thereof and may have a thickness of at least twelve mils (12 mil). In some embodiments, the reinforcing elements 202 may be a grid of coated steel cords.

The bed liner panel 200 may be rectangular. The bed liner panel 200 may have a width that is at least the side-to-side width of the cargo bed 902 plus twice the depth of the cargo bed 902. The bed liner panel 200 may have a length that is at least the front-to-rear length of the cargo bed 902 plus three times the depth of the cargo bed 902. In a preferred embodiment, the bed liner panel 200 may overhang the cargo bed 902 by at least eight inches (8 in.) on both sides and the rear of the cargo bed 902 and may extend at least to the top of the cab 908 of the pickup truck 900 in the front.

In some embodiments, the bed liner panel 200 may be waterproof, UV-resistant, mildew resistant, tear/puncture resistant, or any combination thereof as a result of the choice of materials, construction techniques, and/or coatings.

In some embodiments, the bed liner panel 200 may comprise a fold 204 located at the front of the bed liner panel 200. The fold 204 may be folded to form a pocket for storing the plurality of straps.

The plurality of straps may be operable to hold the bed liner panel 200 in place and/or to facilitate unloading the bulk cargo 920. The plurality of straps may comprise at least two (2) rear straps 210 and a plurality of front straps 220.

The rear straps 210 may be coupled to the rear of the bed liner panel 200. The rear straps 210 may be operable to detachably couple the bed liner panel 200 to the rear bumper 906 of the pickup truck 900 to prevent the bed liner panel 200 from sliding into the cargo bed 902 as the bulk cargo 920 is loaded. An individual rear strap 210 may couple to the rear bumper 906 via a strap coupler 216. As non-limiting examples, the strap coupler 216 may be a hook, a clip, a clamp, or any combination thereof. An individual rear strap 210 may comprise a length adjuster 214 to adjust the length of the rear strap 210 such that the rear strap 210 may conform to the size of the pickup truck 900.

The plurality of front straps 220 may be coupled to the front of the bed liner panel 200. The plurality of front straps 220 may be operable to pull the front of the bed liner panel 200 rearwards to facilitate unloading the bulk cargo 920. An individual front strap 220 may comprise a front strap loop 222 located at the free end thereof. The length and positions of the front strap 220 may define a V-shaped configuration such that the free ends of the front strap 220 may be pulled to a common point in front of the center of the bed liner panel 200 where the individual front strap 220 may be coupled together via the front strap loops 222. In a preferred embodiment, there may be four (4) front straps.

Figure 5:
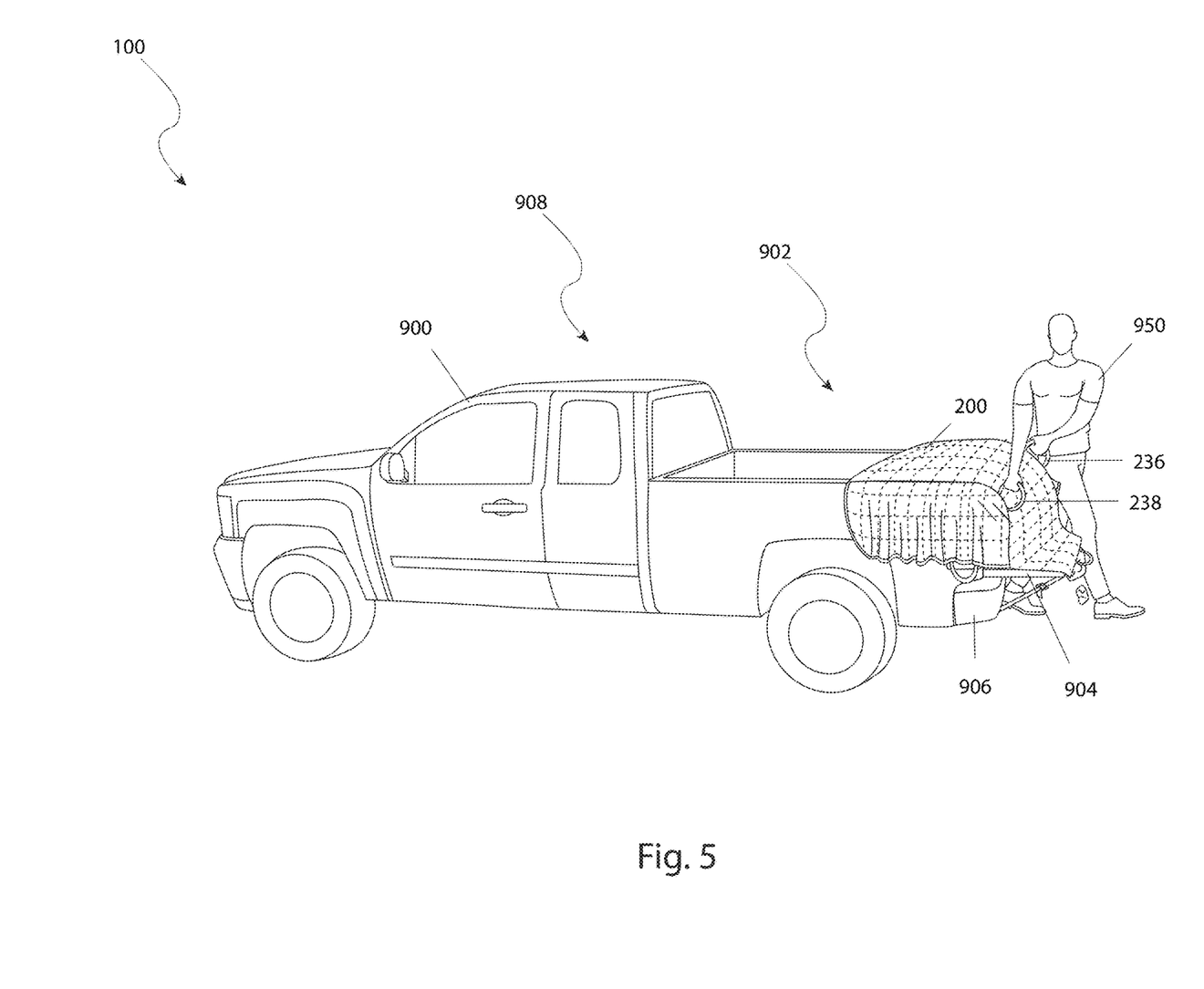

In some embodiments, the bed liner panel 200 may comprise a plurality of handles 232, 234, 236, 238. The plurality of handles in the exemplary embodiment may comprise one (1) or more front edge handles 232, one (1) or more rear edge handles 234, one (1) or more left edge handles 238, one (1) or more right edge handles 236, or any combination thereof. The plurality of handles 232, 234, 236, 238 may be adapted for a user 950 to grasp in order to position the bed liner panel 200 while placing the bed liner panel 200 over the cargo bed 902. The plurality of handles 232, 234, 236, 238 may be adapted for the user 950 to pull in order to unload the bulk cargo 920 when the bulk cargo 920 is lightweight.

In some embodiments, the device 100 may comprise a plurality of magnets 240. The plurality of magnets 240 may be coupled to the bed liner panel 200 within the front one third (⅓) of the bed liner panel 200 and may be operable to hold the bed liner panel 200 in place against the cab 908 of the pickup truck 900. As non-limiting examples, the plurality of magnets 240 may be neodymium magnets.

Figure 4:
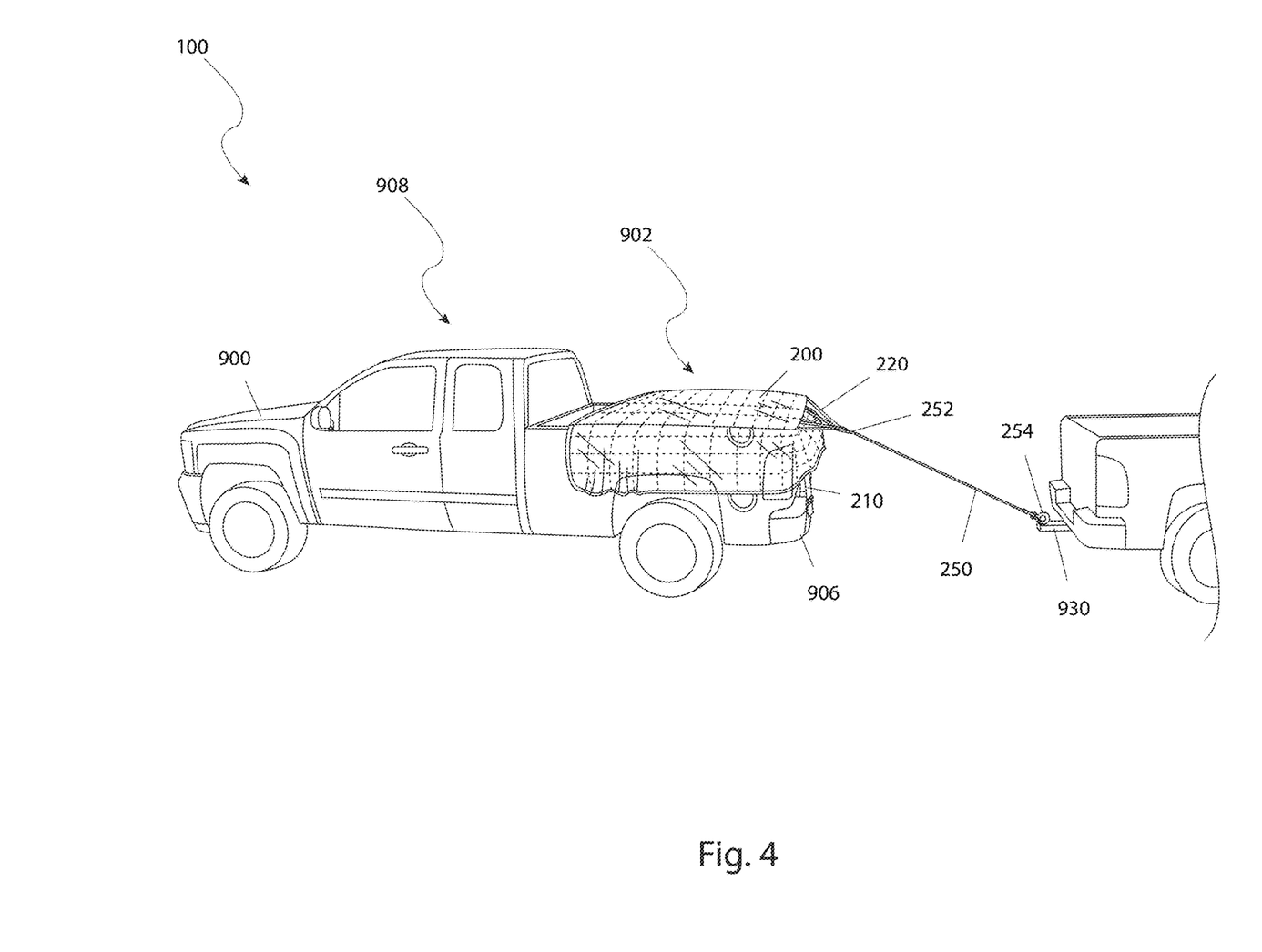
FIG. 4 is an in-use view of a quick unload truck bed liner 100, according to an embodiment of the present device, illustrating unloading the bed 902 using the unloading cable 250 and an anchor point 930; and, FIG. 5 is an in-use view of a quick unload truck bed liner 100, according to an embodiment of the present device, illustrating a user 950 unloading a light cargo using one (1) or more left edge handles 238 and one (1) or more right edge handles 236.

In some embodiments, the device 100 may comprise an unloading cable 250. The unloading cable 250 may be coupled between the plurality of front straps 220 and an anchor point 930 to facilitate unloading the bulk cargo 920. As non-limiting examples, the anchor point 930 may be a trailer hitch, a tow bar, or a bumper of another vehicle or a tree. The unloading cable 250 may comprise a first hook 252 and a second hook 254 located on opposite ends of the unloading cable 250. The first hook 252 may be coupled to the front strap loops 222 of the plurality of front straps 220 and the second hook 254 may be coupled to the anchor point 930. The unloading cable 250 may be coupled to the anchor point 930 directly using the second hook 254 or by wrapping the unloading cable 250 around the anchor point 930 and coupling the second hook 254 back onto the unloading cable 250.

With the unloading cable 250 in place and with the pickup truck 900 facing away from the anchor point 930, the pickup truck 900 may be driven slowly away from the anchor point 930 such that the front of the bed liner panel 200 is pulled back over the top of the bulk cargo 920 until the bulk cargo 920 is unloaded. Alternatively, the pickup truck 900 may remain stationary and the anchor point 930 may be moved away from the pickup truck 900.

In another embodiment, the device 100 consists of all the aforementioned elements precisely as described. The bed liner panel 200 is designed to cover the cargo bed 902 of the pickup truck 900 completely, ensuring the protection of the cargo bed 902 from the bulk cargo 920. The rear straps 210 are securely attached to the rear of the bed liner panel 200 and are equipped with strap couplers 216, which may be in the form of hooks, clips, or clamps, providing a reliable means to attach the rear straps 210 to the rear bumper 906 of the pickup truck 900. The front straps 220 are attached to the front of the bed liner panel 200, forming a V-shaped configuration, and include front strap loops 222 for ease of connection. The device further includes a plurality of handles 232, 234, 236, 238 strategically placed around the edges of the bed liner panel 200, facilitating user manipulation and handling. Additionally, the bed liner panel 200 features a set of magnets 240 in its front one-third portion to ensure it stays in place against the cab 908. To aid in unloading, the device incorporates an unloading cable 250 with a first hook 252 and a second hook 254 for attachment to an anchor point 930. The specified materials, dimensions, and attachment mechanisms are meticulously chosen to optimize functionality and durability, ensuring that the quick unload truck bed liner 100 performs efficiently under the intended operational conditions.

Figure 2:
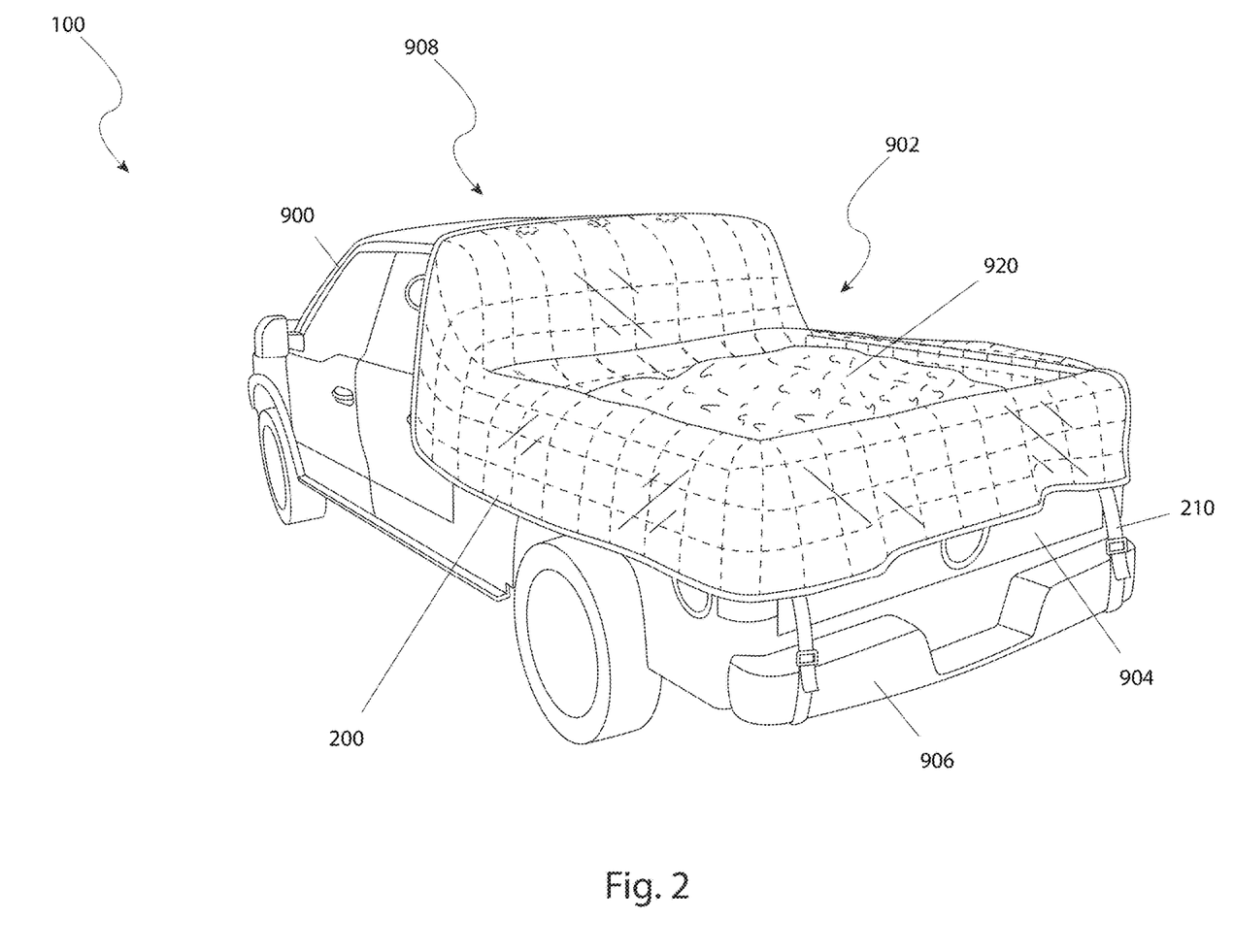
FIG. 2 is an in-use view of a quick unload truck bed liner 100, according to an embodiment of the present device.

In use, the tailgate 904 of a pickup truck 900 may be lowered and the bed liner panel 200 may be positioned to cover the cargo bed 902. The tailgate 904 may be raised and the bulk cargo 920 may be loaded into the cargo bed 902. The pickup truck 900 may be driven to a destination where the bulk cargo 920 is to be unloaded. The pickup truck 900 may be positioned with the tailgate 904 adjacent to where the bulk cargo 920 is to be left such that the pickup truck 900 is facing away from an anchor point 930. The first hook 252 of the unloading cable 250 may be coupled to the front strap loops 222 of the plurality of front straps 220, the second hook 254 of the unloading cable 250 may be coupled to the anchor point 930, and the tailgate 904 may be lowered. The pickup truck 900 may be driven slowly away from the anchor point 930 such that the front of the bed liner panel 200 is pulled back over the top of the bulk cargo 920 until the bulk cargo 920 is unloaded. Alternatively, the pickup truck 900 may remain stationary and the anchor point 930 may be moved away from the pickup truck 900.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:
1. A truck bed liner, comprising:
a flexible, rectangular bed liner panel with dimensions sufficient to cover cargo bed of truck, comprising:
   a width that is at least equal to side-to-side width of the cargo bed plus twice depth of the cargo bed;
   a length that is at least equal to front-to-rear length of the cargo bed plus three times the depth of the cargo bed; and,
   a thickness of at least 12 mils, the bed liner panel comprising reinforcing elements configured as a grid of coated steel cords;
a plurality of rear straps coupled to rear portion of the bed liner panel, the rear straps each comprising:
   a strap coupler configured to detachably couple the rear straps to a rear portion of the truck; and,
   a length adjuster operable to adjust the length of the rear straps to accommodate different truck configurations;
a plurality of front straps coupled to front portion of the bed liner panel, wherein:
   the plurality of front straps are configured in a V-shaped arrangement with free ends terminating in front strap loops; and,
   the front strap loops are adapted to converge at a common point to facilitate attachment to an unloading cable;
a plurality of handles coupled to the bed liner panel, the handles including at least:
   a front edge handle, a rear edge handle, a right edge handle, and a left edge handle, each handle configured to allow a user to grasp and manipulate the bed liner panel for positioning or unloading;
a fold located at the front of the bed liner panel, the fold forming a pocket for storing the front straps when not in use;
a plurality of magnets coupled to a front one-third portion of the bed liner panel, the magnets operable to hold the bed liner panel in place against cab of the truck during use; and,
an unloading cable coupled between the front straps and an anchor point, the unloading cable comprising:
   a first hook configured to attach to the front strap loops; and,
   a second hook configured to attach to the anchor point selected from a group consisting of a trailer hitch, a tow bar, a bumper of another vehicle, or a fixed object; and,
wherein the truck bed liner is operable to facilitate the unloading of bulk cargo by pulling the front straps in a rearward direction, thereby overturning the bed liner panel from a front position to a rear position.
2. The truck bed liner device of claim 1, wherein:
the bed liner panel is made from a material selected from a group consisting of polyester, nylon, polyethylene, polypropylene, and canvas, the material being waterproof, UV-resistant, mildew-resistant, tear-resistant, and puncture-resistant;
the rear straps prevent the bed liner panel from sliding into the cargo bed during loading of bulk cargo;

the plurality of magnets are neodymium magnets positioned to maintain alignment and stability of the bed liner panel; and the unloading cable is configured to be wrapped around the anchor point and coupled back to itself using the second hook.

* * * * *